Figure 1:
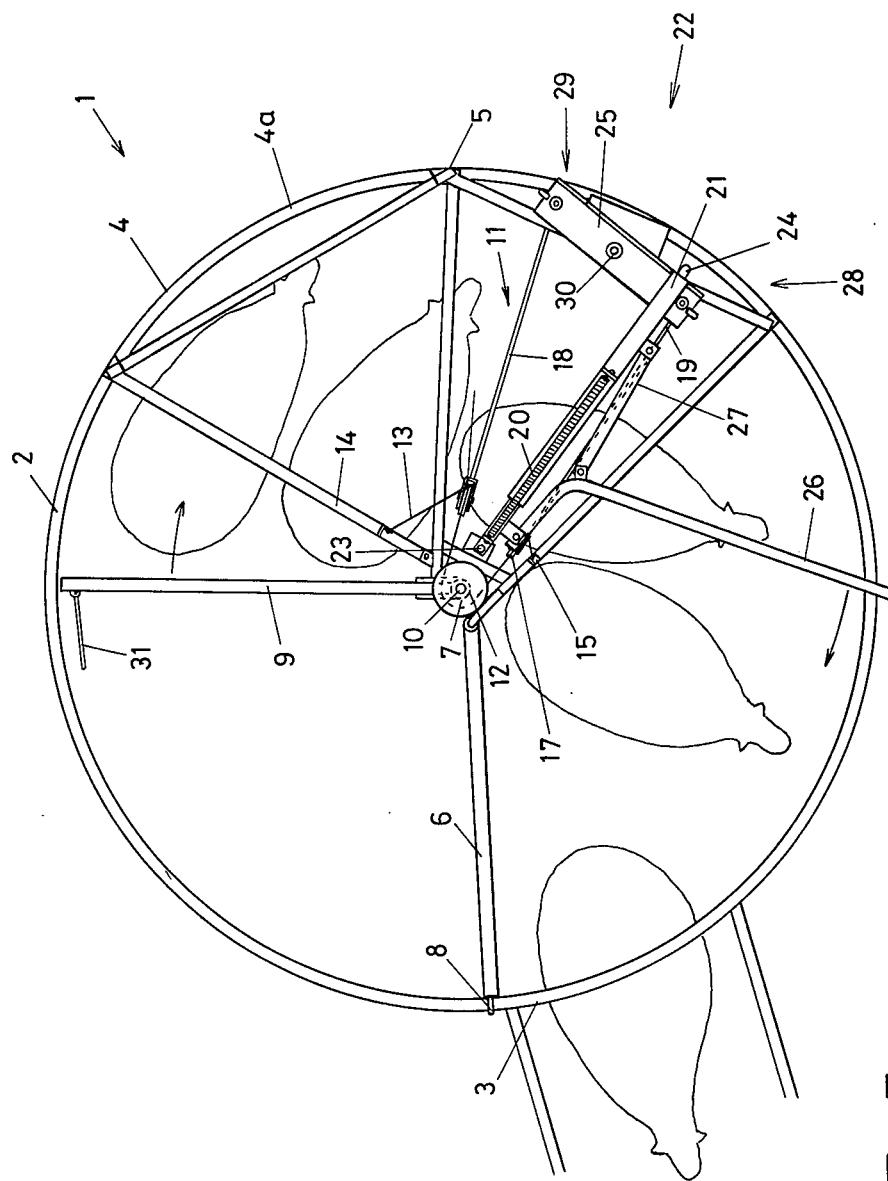

United States Patent [19]
Hopkins

[11] 4,275,685
[45] Jun. 30, 1981

[54] APPARATUS FOR THE HANDLING OF SHEEP

[75] Inventor: Donald L. Hopkins, Heywood, Australia

[73] Assignee: Alf Hannaford & Co. Pty. Ltd., Beverley, Australia

[21] Appl. No.: 127,757

[22] Filed: Mar. 6, 1980

[30] Foreign Application Priority Data

Mar. 7, 1979 [AU] Australia .............................. PD7940

[51] Int. Cl.³ .............................................. A01K 29/00
[52] U.S. Cl. ...................................... 119/20; 119/155
[58] Field of Search .................... 112/20, 155, 14.03, 112/103, 14.04

[56] References Cited
U.S. PATENT DOCUMENTS

| | | | |
|---|---|---|---|
| 3,343,521 | 9/1967 | Moores | 119/20 |
| 3,460,515 | 8/1969 | Page et al. | 119/14.04 |
| 3,545,407 | 12/1970 | Moore | 119/20 |

*Primary Examiner*—Hugh R. Chamblee
*Attorney, Agent, or Firm*—Oldham, Oldham, Hudak & Weber Co.

[57] ABSTRACT

An arrangement for handling sheep which includes a circular pen having two barricades each radially aligned within the pen and being supported and aligned relative to an inlet and an outlet and with drive means connected to one of the movable barricades so that sheep can be urged through an outlet while another portion of the pen behind the moving barricade can be filled with sheep and by a realignment of the position of the barricades and a driving mechanism sheep can be driven through the same outlet with such reversal of direction of the barricades.

6 Claims, 5 Drawing Figures

APPARATUS FOR THE HANDLING OF SHEEP

This invention relates to apparatus for the handling of sheep.

It is a well known problem in relation to the handling of sheep that sheep will generally not freely lead into a closed chute or pen, and if a person wishes to have a device which will in effect automatically provide that sheep are supplied along a chute, there are obvious difficulties especially if the person wishes to effect this movement without being present.

This invention relates to a device which is intended to act prior to a chute by which sheep can be held having been herded into the pen by perhaps a dog.

The object of this invention then is to provide a pen having apparatus which will generally assist in handling of sheep especially where there might be required a number of sheep to follow into a pen and an operator needs only to attend this intermittently.

According to one form of this invention then it can be said to reside in an apparatus for handling sheep the invention being characterised by including a pen providing a circular restraining outer barricade, an inlet and an outlet which is spaced apart from the inlet, for sheep through the outer barricade, a first movable barricade supported and adapted so that in a first selected position, it will extend between and act as a barricade for sheep between a centre of the pen and one side of the outlet, and, in a second position, it will extend between and act as a barricade for sheep between a centre of the pen and the other side of the outlet, a second movable barricade with one end supported at the centre of the pen and the barricade otherwise being supported so that the barricade is adapted to move while in a radial direction relative to the circular shape of the outer barricade, behind sheep retained within the outer barricade being urged past through the outlet, and drive means adapted to urge the said second movable barricade in a direction radially about its centre supported and selected so as to urge sheep through the open outlet.

It is implicit in this description that upon sheep being retained within the pen, the second movable barricade is driven so that it will simply softly push against the sheep and will move as the sheep move around the pen into the open outlet.

If however for any reason the sheep are disturbed such as can very often happen with dogs in the vicinity or otherwise, they will find it much more difficult to free themselves of the confining effect of the following barricade.

It is a preferred feature that there is an additional reverse direction braking means associated with the second movable barricade so that if the drive means are not strong enough in themselves to resist the action of the sheep then the braking means will act to anchor this strongly against such action of the sheep.

However continuing the description of the second movable barricade, it is expected that this will continue in its direction until the sheep are cleared from the pen or substantially so and it is then implicit that the first said barricade is shifted from being supported at one side of the outlet to the other and then the drive connections to a second movable barricade are altered as if a reverse direction braking means is connected such reverse braking means being also reversed so that the second movable barricade then turns in the reverse direction which would be expected in the meantime to have been filled with sheep by a dog once the second barricade has moved while moving in the first direction past the gate.

There is then this intended reverse direction effect so that loading and unloading can take place simultaneously from the pen and the operation can be to a large extent automated.

Preferably the drive means includes a cable wrapped around a drum which is coaxially secured to a pivot support axle secured to the second said movable barricade and there are pressure means adapted to selectively pull relatively to one end or the other of the said cable to provide a driving force for the movement of the second said barricade.

In the preferred arrangement, the pressure means comprise a helical spring and there is a lever arm tensioning mechanism to selectively extend and thereby tension the helical spring, and further means whereby the said spring when tensioned, can be selectively connected to exert pressure relative to either of the ends of the cable.

Figure 2:
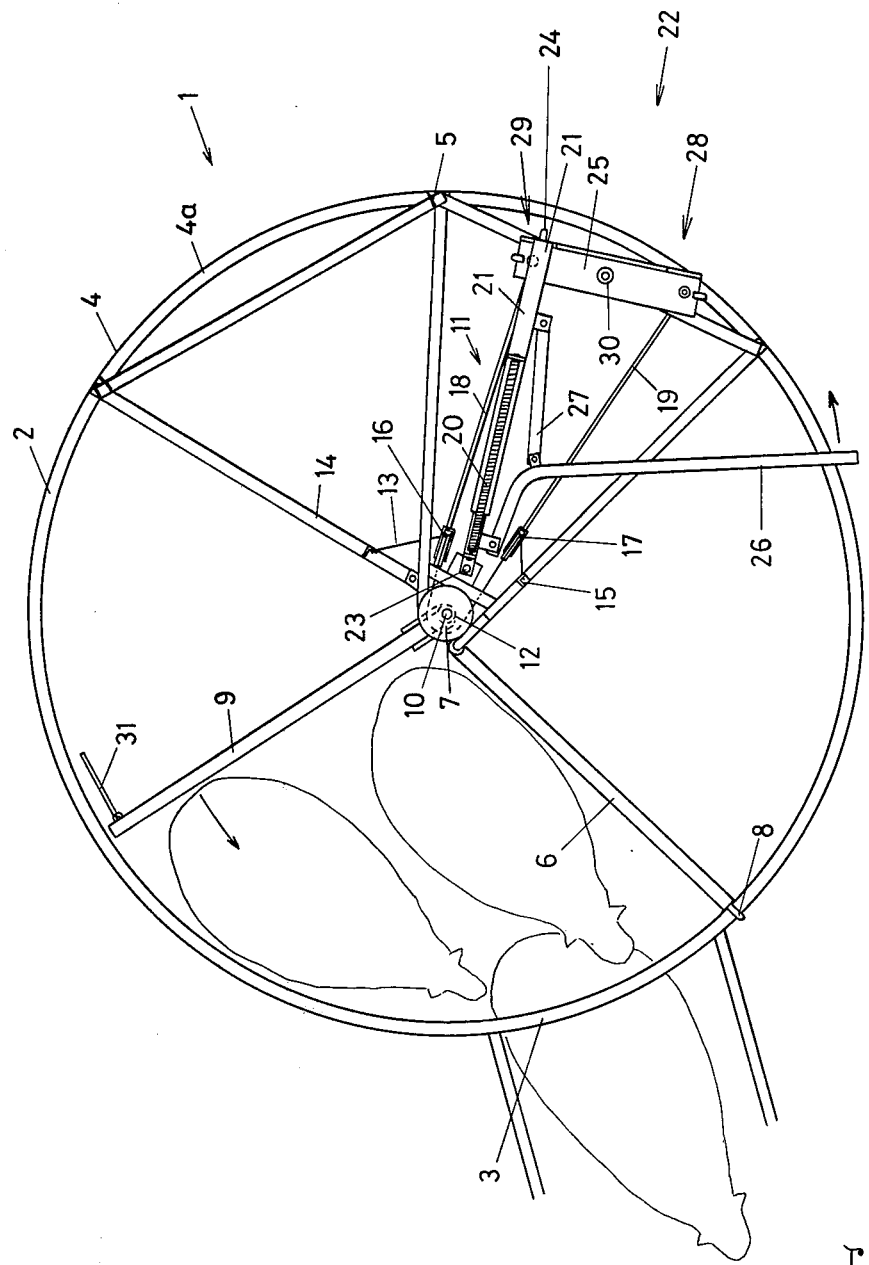
Figure 3:
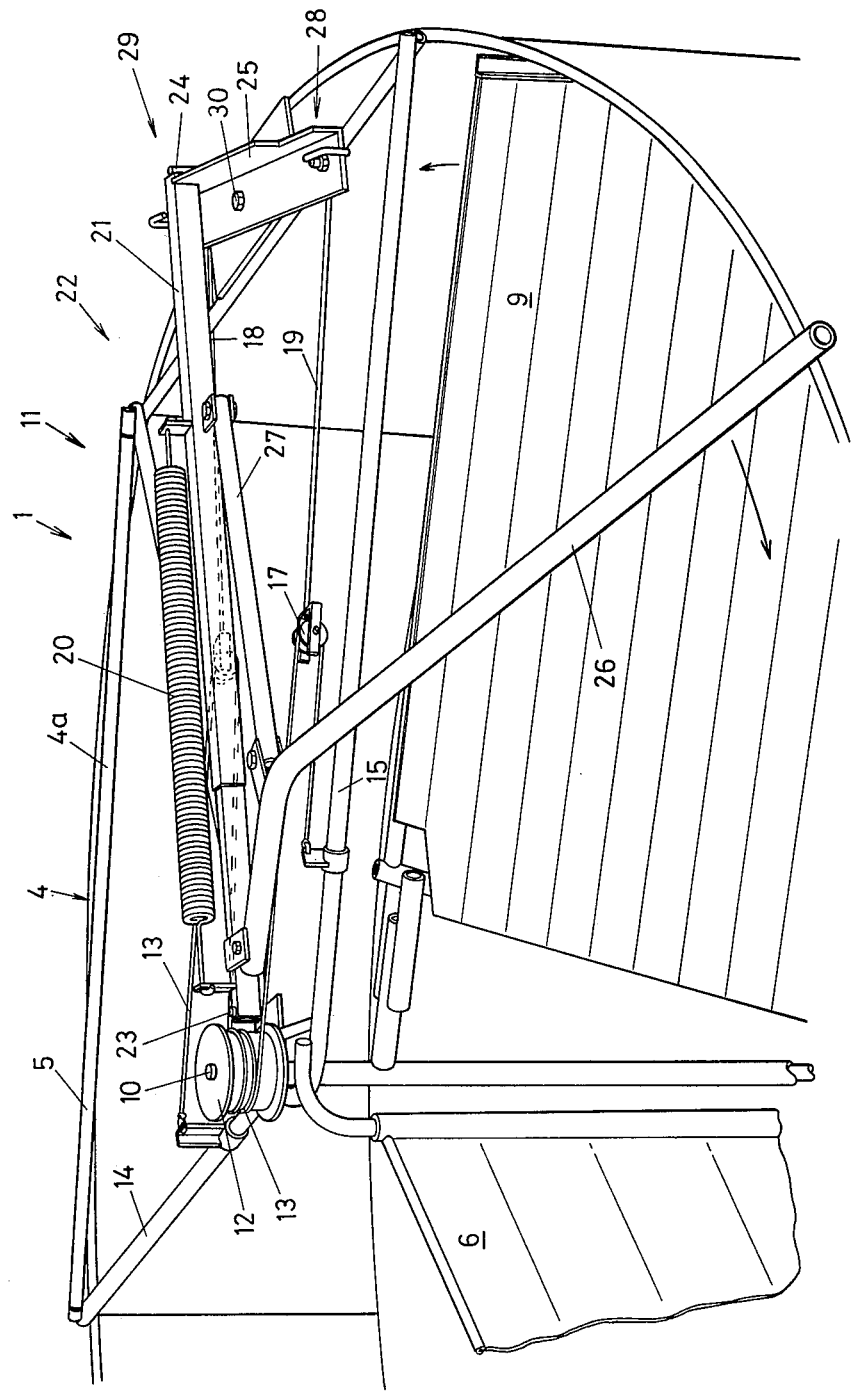
Figure 4:
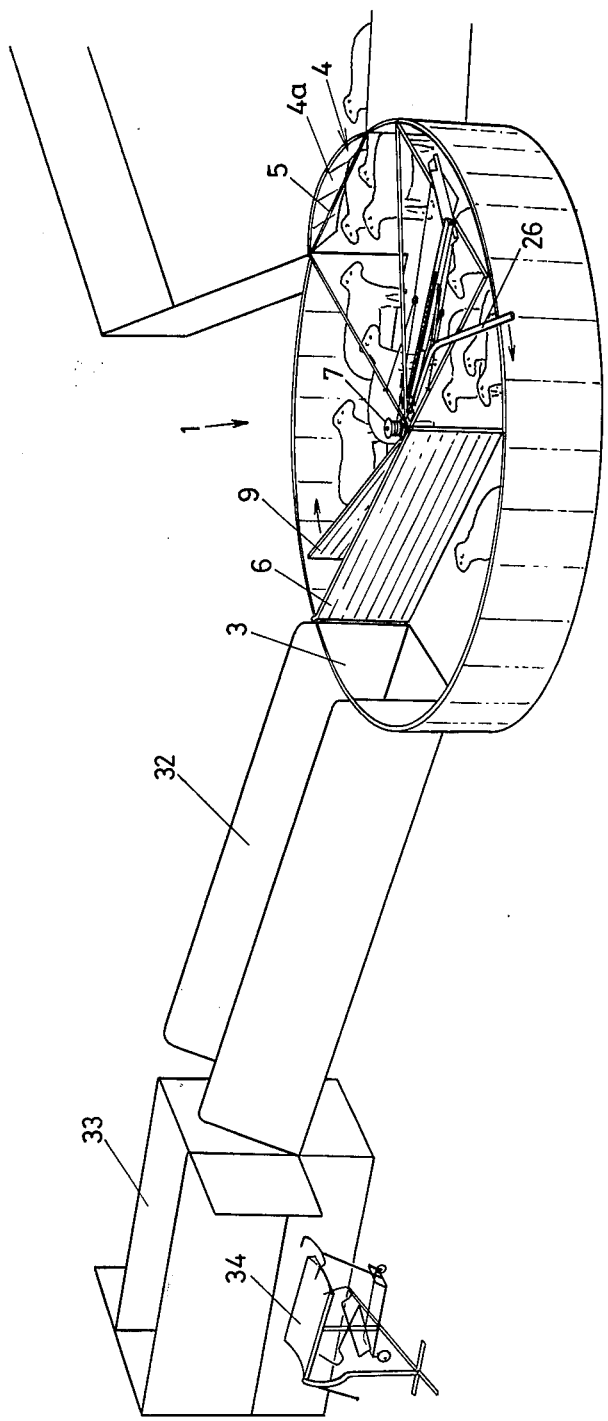

The invention will be better understood with reference to a preferred embodiment which shall now be described with the assistance of drawings in which:

FIG. 1 is a plan view of the preferred embodiment showing to some extent schematically a first position of the elements of the embodiment, FIG. 2 is the same view of the preferred embodiment as in FIG. 1 with the moving barricades however positioned to be driving sheep in an opposite direction through an outlet, FIG. 3 is a perspective view showing more detail of the drive mechanism and, FIG. 4 is a perspective view of an assembly in which typically an arrangement according to the preferred embodiment is coupled on the one side with an entry yard holding sheep, an inlet gate being in a half opened position and an outlet of the pen opening into a chute which in turn opens into a control pen from which a sheep might be extracted onto a handling cradle.

Figure 5:
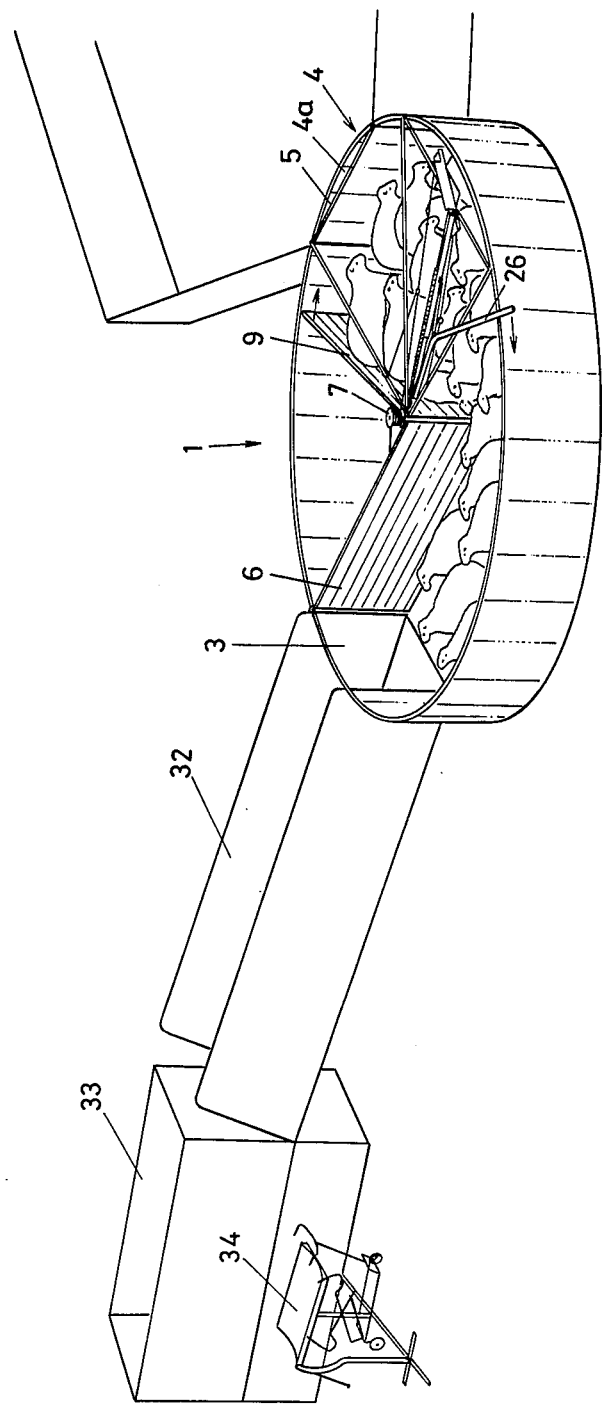

FIG. 5 is a perspective view with the inlet gate closed.

Referring now in detail to the drawings, the pen 1 is provided by a circular restraining outer barricade 2 and an outlet 3 spaced apart from a inlet 4 each of these being effective for sheep to pass therethrough. The outlet 3 is simply a gap in the barricade 2 while the inlet 4 has a gate which in this instance is an arcuate shaped portion forming generally a portion of the perimetrial barricade 2.

The gate 4a is pivotally supported about a horizontal axis 5 so that in a raised position sheep can pass into the pen 1 and in a lowered position it will define with the remainder of the barricade 2 the confining perimeter of the pen 1.

There are two movable barricades each of which extends radially from a central location relative to the circular shape of the pen a first of these movable barricades 6 being supported and adapted so that in a first selected position, such as is shown in FIG. 1, it will extend between and act as a barricade for sheep between a centre of the pen 7 and one side of the outlet 3.

In a second position as shown in FIG. 2, it will extend between and act as a barricade for sheep between a centre of the pen 7 and the other side of the outlet 3.

This first movable barricade 6 has at an outer upper end a hook 8 which releasably attaches to an upper portion of the side of the outlet.

A second movable barricade 9 has one end supported at the central vertical axis of the pen 10 and is otherwise supported so that the barricade 9 is adapted to move while maintaining a radial position relative to the circular shape of the outer barricade, behind sheep retained within the outer barricade 2 being urged to pass through the outlet 3.

The drive means for driving the second movable barricade 9 in one direction or in the other as selected is shown at 11 and includes a drum 12 which is secured to the vertical central axis 10. Around this drum is a cable 13 wound several times and the two ends of the cables are secured each to in one case frame member 14 and in the other case frame member 15.

The tension on the cable 13 is governed by in each case the tension on pulleys 16 and 17 and this is controlled by tension on rod 18 or 19.

Such tension is controlled by spring 20 acting through arm 21 which is part of a lever arm assembly 22 which is pivotally supported at an inner end at 23 in which has an outer end locating pin 24 which engages the rocker arm assembly 25.

The spring is compressed from time to time by control arm 26. Control arm 26 is linked to the extendible lever arm assembly 22 by link 27.

In operation the position of the arm 22 is varied in relation to the rocker arm assembly 25 and this is achieved by first extending the spring 20 and then relocating the position from one side for instance 28 to the other side 29 of the rocker arm assembly 25 which of course is pivotally to the frame of the pen at pivot axis 30.

By pulling on the arm 26 the spring 20 can be extended so as to change its position as explained from the position 28 to 29 on the rocker arm assembly 25 and then upon the change of position occurring the spring 20 will continue to pull pressure on the opposite side of the rocker arm assembly 25 which will be transmitted through the appropriate rod for instance as shown in FIG. 3 as 19 which in turn will apply pressure through the appropriate pulley 17 in this case will cause a rotating force on the drum 12.

It will be readily appreciated that the force involved will be quite small but that it has been found in practice this is sufficient to keep the barricade against the sheep and the existence of the pressure is sufficient to retard any action by the sheep against the barricade and urge them slowly forward into the chute.

A trailing arm 31 behind the direction of movement of the second barricade 9 is pivotally supported and in effect is arranged to drag behind the barricade and assists in maintaining its position against rearward force if the sheep in fact do become disturbed.

This trailing arm 31 can be varied in position from one side to the other so as to be operable in either of the directions as necessary.

It will now be seen that in operation the action will provide a very efficient and in fact useful system by which one man can maintain a continuous supply of sheep into a chute shown in FIG. 4 as 32 for purposes such as holding in a holding apparatus 33 and perhaps installing on a shearing machine 34.

Having now described the preferred embodiment it will be appreciated that many variations in general terms can be used while not departing from at least one or more of the wider concepts of this invention.

The means to drive the second barricade 9 can of course be varied and while the mechanism shown in itself has much inventive merit nonetheless other devices can also be achieved to propose the system where the invention lies in the broader system of using the barricade in the manner shown.

I claim:

1. An arrangement for handling sheep characterised by including a pen providing a circular restraining outer barricade, an inlet and an outlet spaced apart from the inlet in each case being for sheep to pass through the said outer barricade, a first movable barricade supported and adapted so that in a first selected position, the said movable barricade will extend between and act as a barricade for sheep between a centre of the pen and one side of the outlet, and, in a second position, the said movable barricade will extend between and act as a barricade for sheep between a centre of the pen and the other side of the outlet, a second movable barricade with one end supported at a centre of the pen and the barricade otherwise being supported so that the barricade is adapted to move while in a radial alignment relative to the circular shape of the outer barricade, behind sheep retained within the outer barricade being urged to pass through the outlet, and drive means adapted to urge the said second movable barricade in a direction while aligned radially to rotate about its axial support located at the centre of the pen and otherwise supported and select so as to urge sheep through the open outlet.

2. An arrangement for handling sheep as in claim 1 further characterised in that there is included a reverse direction braking means adapted to selectively act to resist reverse direction movement of the said second barricade.

3. An arrangement for handling sheep as in either claim 1 or claim 2 further characterised in that a drum is coaxially secured to a pivot support axle of the second said barricade.

4. An arrangement for handling sheep according to either of claims 1 or 2 further characterised in that the drive means include a drum coaxially secured to a pivot support axle of the second said barricade, a flexible cable wrapped around the drum, and pressure means adapted to selectively pull relatively to one end or the other of the said cable to provide a driving force for the movement of the second said barricade.

5. An arrangement for handling sheep as in claim 4 wherein the said pressure means are further characterised by including a helical spring, a lever arm tensioning mechanism to selectively extend and thereby tension the helical spring, and means whereby the said tensioned spring can be selectively connected to exert pressure relative to either of the ends of the cable.

6. An arrangement for handling sheep as in claim 2 further characterised in that the reverse direction braking means are comprised of an arm adapted by its support relative to the movable barricade and its position relative to the movable barricade to trail behind the barricade when this is moving in a selected forward direction and to act by engaging into the ground upon any reverse pressure whereby to resist such reverse pressure acting to move the barricade in the opposite direction.

* * * * *